United States Patent
Huber-Buschbeck et al.

(10) Patent No.: US 7,752,087 B2
(45) Date of Patent: Jul. 6, 2010

(54) METHODS AND SYSTEMS FOR ROUNDING WITH AVAILABILITY CHECK

(75) Inventors: Andreas Huber-Buschbeck, Heiligkreuzsteinach (DE); Hans-Ulrich Von Helmolt, Heidelberg (DE)

(73) Assignee: SAP AG, Walldorf (DE)

( * ) Notice: Subject to any disclaimer, the term of this patent is extended or adjusted under 35 U.S.C. 154(b) by 470 days.

(21) Appl. No.: 11/516,698

(22) Filed: Sep. 7, 2006

(65) Prior Publication Data

US 2007/0094102 A1   Apr. 26, 2007

(30) Foreign Application Priority Data

Sep. 7, 2005   (EP)   ................................. 05108222

(51) Int. Cl.
    *G06Q 10/00* (2006.01)
(52) U.S. Cl. .................. 705/28; 705/8; 705/9; 705/10; 705/22; 705/29; 700/96; 700/97; 700/99; 700/100; 700/95; 700/101; 700/102; 700/213
(58) Field of Classification Search .................... 705/28
    See application file for complete search history.

(56) References Cited

U.S. PATENT DOCUMENTS

| | | | | |
|---|---|---|---|---|
| 4,749,008 A | * | 6/1988 | Whitney et al. | 141/1 |
| 5,607,642 A | * | 3/1997 | Lepper et al. | 422/62 |
| 5,699,259 A | * | 12/1997 | Colman et al. | 700/99 |
| 6,721,762 B1 | * | 4/2004 | Levine et al. | 707/104.1 |

OTHER PUBLICATIONS

Bard, Jonathan F.; Wan, Lin. Weekly scheduling in the service industry: an application to mail processing and distribution centers. IIE Transactions, May 2005. vol. 37, No. 5, p. 379(18).*

* cited by examiner

*Primary Examiner*—F. Zeender
*Assistant Examiner*—Fawaad Haider
(74) *Attorney, Agent, or Firm*—Finnegan, Henderson, Farabow, Garrett & Dunner, L.L.P.

(57) ABSTRACT

Systems and methods are provide for optimizing the result of an availability check of a required quantity of products, wherein a plurality of rounding algorithms are provided. In one embodiment, a method is provided that comprises a first step of rounding, according to at least one predetermined rounding algorithm, the required quantity of products. The method may also comprise a second step of checking availability of the rounded quantity of products and a third step of rounding down, according to the at least one predetermined rounding algorithm, the available quantity of products if the available quantity of products is lower than the rounded required quantity of products.

8 Claims, 3 Drawing Sheets

METHODS AND SYSTEMS FOR ROUNDING WITH AVAILABILITY CHECK

TECHNICAL FIELD

The present invention generally relates to the fields of data processing and inventory management. More specifically, the invention relates to methods, systems, and computer program products for managing inventory within one or more enterprise systems. Such enterprise systems may comprise procurement systems, sales information systems, purchasing systems, logistic information systems and/or supply chain management systems.

BACKGROUND INFORMATION

Today, the success of an enterprise depends essentially on the requirement that customer demands on products and services be fulfilled quickly, cost-efficiently, and with the highest quality. Therefore, many enterprises use or implement supply chain management systems to control and optimize their production processes and costs.

Supply chain management may comprise the practice of controlling the flow of goods, services, information, and/or finances between the involved parties, such as manufacturers, suppliers, wholesalers, retailers, and consumers. This process may include order processing, information feedback, and the efficient and timely delivery of goods and/or services.

Currently, supply chain management systems use demand-quantity-oriented rounding algorithms, which round for larger or smaller package units in very rough rounding steps. Package units may comprise a packet, pallet, carton, transporter, or container. The rounding algorithms function by rounding a given quantity of products to a multiple of packages, whereby the rounding result is irrespective of the given quantity of products and the different package units. Demand-quantity-oriented rounding does not give the possibility to control the calculation of the rounding result. Further, prior supply chain management systems, while performing an availability check, round the required quantity of products before the check, or round the available quantity of products after the check.

Accordingly, there is a need for a solution that optimizes the result of an availability check process within a supply chain management system to guarantee that the quantity of products confirmed by an availability check is as near as possible to the required quantity of products.

SUMMARY OF THE INVENTION

In accordance with the principles of the present invention, as embodied and broadly described herein, methods, systems, and computer program products are provided for data processing and inventory management.

According to one embodiment, a method is provided for optimizing the result of an availability check of a required quantity of products, wherein a plurality of rounding algorithms are provided. The method may comprise a first step of rounding, according to at least one predetermined rounding algorithm, the required quantity of products. The method may also comprise a second step of checking availability of the rounded quantity of products and a third step of rounding down, according to the at least one predetermined rounding algorithm, the available quantity of products if the available quantity of products is lower than the rounded required quantity of products.

According to another embodiment, a system is provided. The system may comprise a data storage device which stores a plurality of rounding algorithms, means for rounding, according to at least one rounding algorithm, a required quantity of products, and means for checking availability of a rounded quantity of products.

According to another embodiment, a computer-readable medium is provided, which includes program instructions for performing, when executed by a processor, a method for optimizing the result of an availability check of a required quantity of products, wherein a plurality of rounding algorithms are provided. The method may comprise a first step of rounding, according to at least one predetermined rounding algorithm, the required quantity of products. The method may also comprise a second step of checking availability of the rounded quantity of products and a third step of rounding down, according to the at least one predetermined rounding algorithm, the available quantity of products if the available quantity of products is lower than the rounded required quantity of products.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which constitute a part of this disclosure, illustrate various embodiments and aspects of the present invention and, together with the description, explain the principles of the invention.

DETAILED DESCRIPTION

Reference will now be made in detail to the invention, examples of which are illustrated in the accompanying drawings. The implementation set forth in the following description do not represent all implementations consistent with the claimed invention. Instead, they are merely some examples consistent with certain aspects related to the invention. Wherever possible, the same reference numbers will be used throughout the drawings to refer to the same or like parts.

In a supply chain management system, rounding with an availability check confirms a rounded quantity of products as near as possible to the customer's required quantity of products. If in one embodiment, for rounding, a packsize-oriented-rounding algorithm is used, the availability check confirms multiples of package size to guarantee that the delivered quantity is only a multiple of given package sizes. By using only a multiple of packages, the packaging and transportation processes may be better optimized.

Figure 1:
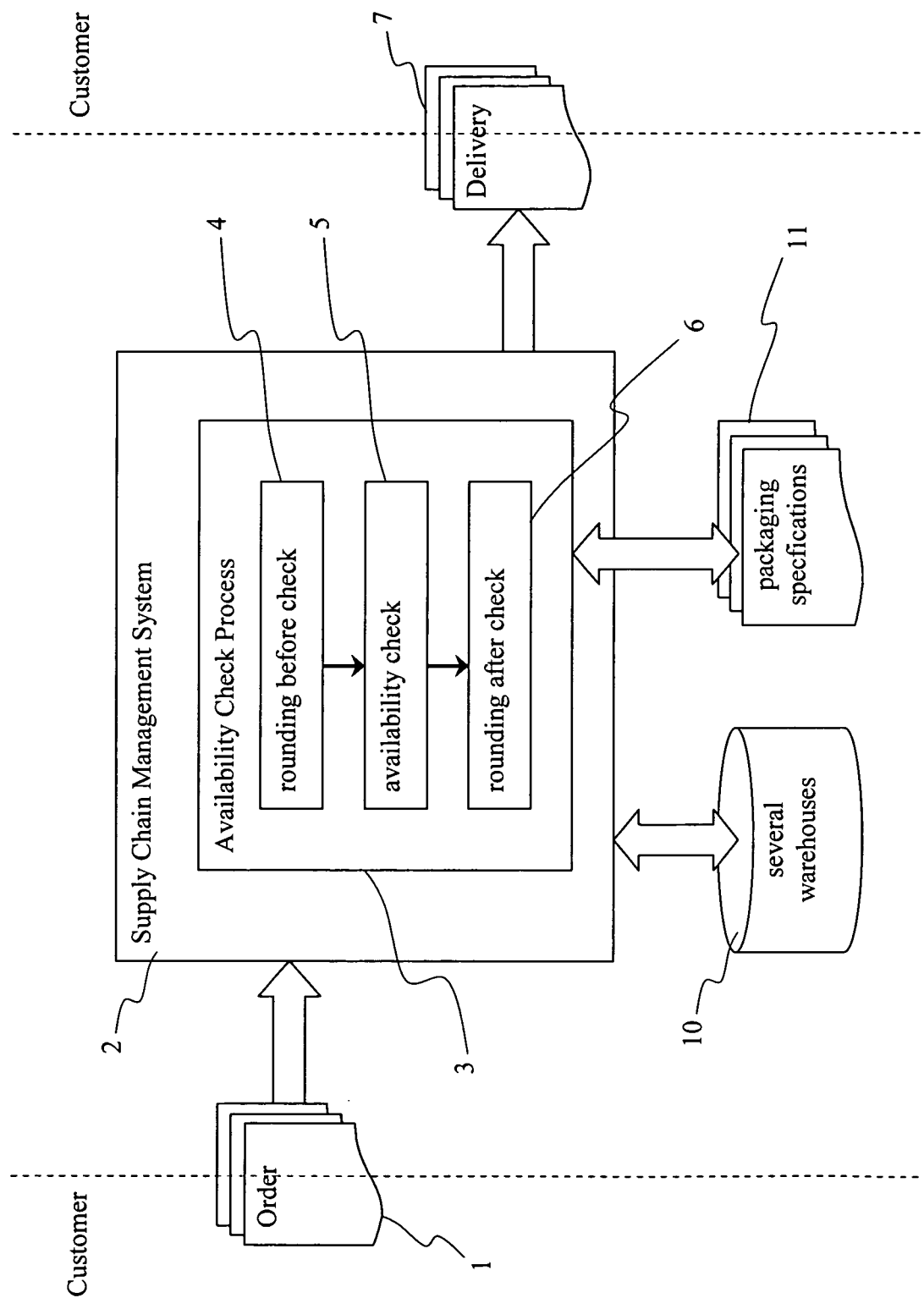
FIG. 1 illustrates an exemplary system for sourcing goods or products within a supply chain management system, consistent with an embodiment of the present invention.

FIG. 1 illustrates an exemplary system capable of performing a sourcing process of products. Initially, a customer may send an order 1 to the enterprise. The order 1 may be in the form of an electronic order transmitted by e-mail or a traditional order transmitted by conventional mail. The order may comprise information about the ordered product and the ordered quantity. Subsequent to receiving the order 1, the enterprise enters the data about the order 1 into the supply chain management system 2, which processes the order 1 and provides information for the delivery step 7. As shown in FIG. 1, an availability check process 3 may be performed within the supply chain management system 2 with respect to the ordered product and the ordered quantity.

In one embodiment, in the supply chain management system 2, the availability check process 3 verifies whether the ordered quantity of products is available in one or more warehouses 10. The warehouses 10 may comprise several warehouses at different locations, whereby the products stored in these warehouses are managed within the supply chain management system 2.

In one embodiment of the invention, the availability check process 3 may comprise rounding processes performed before and after the availability check 5. For example, as illustrated in FIG. 1, rounding before check 4 is performed before the availability check 5. In addition, rounding after check 6 is performed after the availability check 5.

In order to perform the rounding processes 4 and 6, a valid packaging specification out of a plurality of packaging specifications 11 may be determined by the availability check process 3. However, the determination of a valid packaging specification may also be made by the rounding processes. The packaging specifications 11 may be stored within the supply chain management system 2, and the supply chain management system 2 may provide different packaging specifications 11 for different warehouses 10.

In one embodiment, the quantity of the products to be delivered is calculated by the supply chain management system 2 in consideration of the several packaging specifications 11 within the availability check process 3. The sourcing process ends by delivering 7 the products to the customer.

Figure 2:
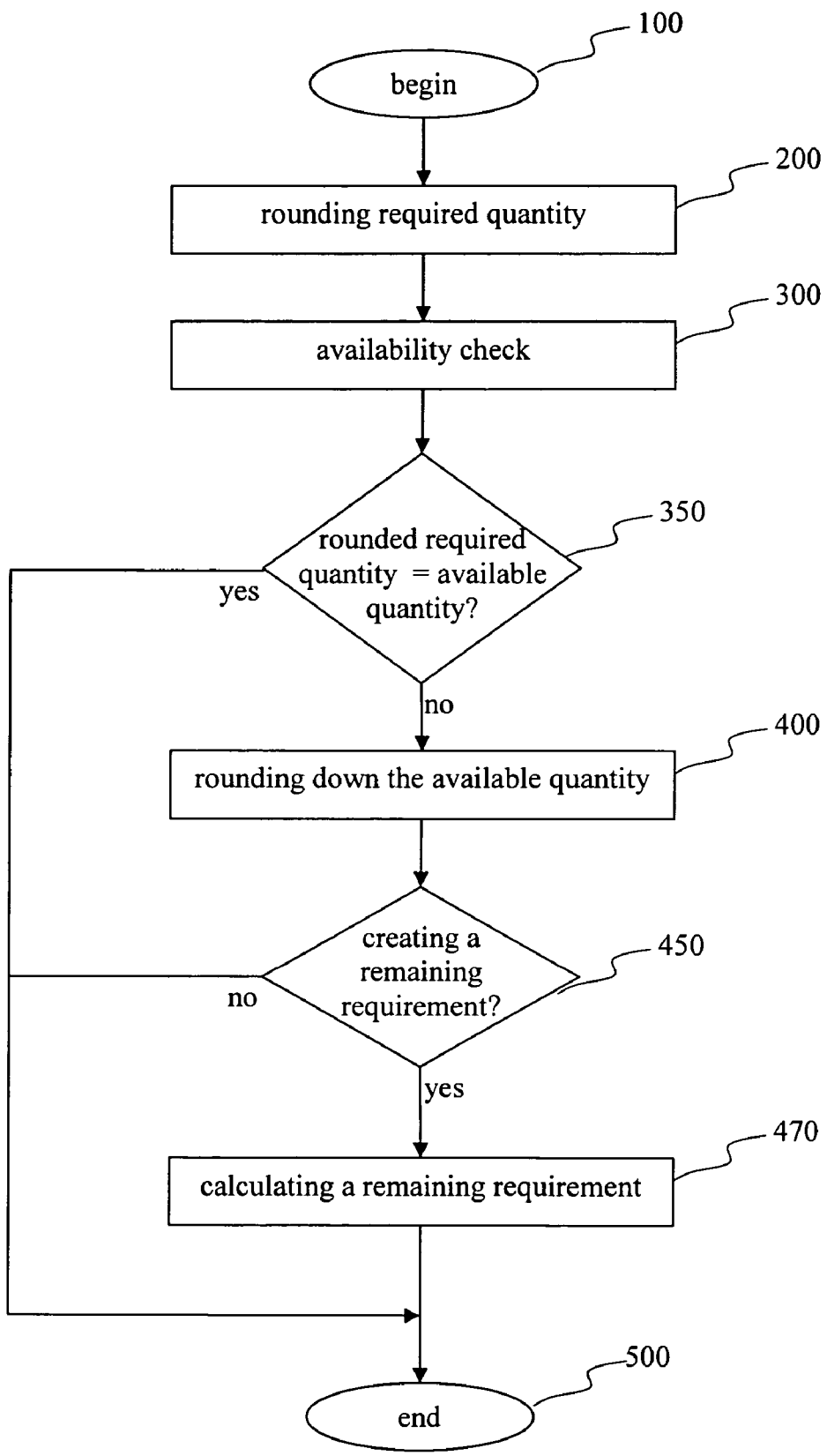
FIG. 2 illustrates a flowchart of an exemplary method for inventory management, consistent with an embodiment of the present invention.

FIG. 2 illustrates a flowchart of an exemplary method for inventory management, consistent with the present invention. In one embodiment, the process is called by an enterprise system. The enterprise system may be, for example, the supply chain management system 2, illustrated in FIG. 1.

The process, starting with step 100, receives from the calling system an order 1 specifying the originally required quantity of products. The originally required quantity of products is rounded in step 200 according to the parameters of a pre-determined rounding algorithm. As illustrated, step 200 is executed before any availability check is performed.

A rounding algorithm defines, among other things, a rounding rule. The rounding rule defines the direction the rounding algorithm is executed, for example, rounding up, rounding down, or rounding to the nearest.

In step 300, an availability check of the rounded required quantity is performed. In the next step 350, the availability of the rounded required quantity on stock is checked by comparing the rounded required quantity with the available quantity of the availability check. If the rounded required quantity equals to the available quantity, the method ends with step 500.

Otherwise, if the rounded required quantity is not equal to the available quantity, the method proceeds with step 400 by rounding down the available quantity even if in the packaging specification a rounding up rule is defined. In this instance, rounding up the available quantity is not possible because there are not enough units on stock. In step 400, the same rounding value parameters are used as those in step 200. For example, if in step 200 a rounding process which rounds to rounding value parameters of complete sales units is used, in step 400 the available quantity is also rounded to complete sales units.

After rounding down the available quantity, the method decides, within step 450, whether a remaining quantity has to be calculated or not. If the difference between the rounded required quantity and the rounded available quantity is larger than the smallest package size, which is defined in the packaging specification, the method calculates in step 470 a remaining requirement. In one embodiment, the remaining requirement is given by the difference between the required quantity and the rounded available quantity.

The method ends with step 500, wherein the rounded required quantity and the rounded available quantity are returned to the calling system. If a remaining requirement was calculated, the method additionally returns the remaining requirement to the calling system. The calling system may handle the difference between the rounded available quantity and the original required quantity and, if necessary, the remaining requirement.

In other embodiments, where a plurality of product locations are defined, the exemplary method, as described above with reference to FIG. 2, may be repeated for each product location until the requirement is completely confirmed or no further product locations are available. In this case, the process may confirm for each product location only a part of the rounded required quantity, whereby the method may consider different packaging specifications for each product location. If the required quantity should be delivered completely from one location, the whole required quantity is checked against the quantity on stock of each location. If the process does not confirm the complete original required quantity, in the last step 500, the remaining requirement for the last location is returned to the calling system.

Figure 3:
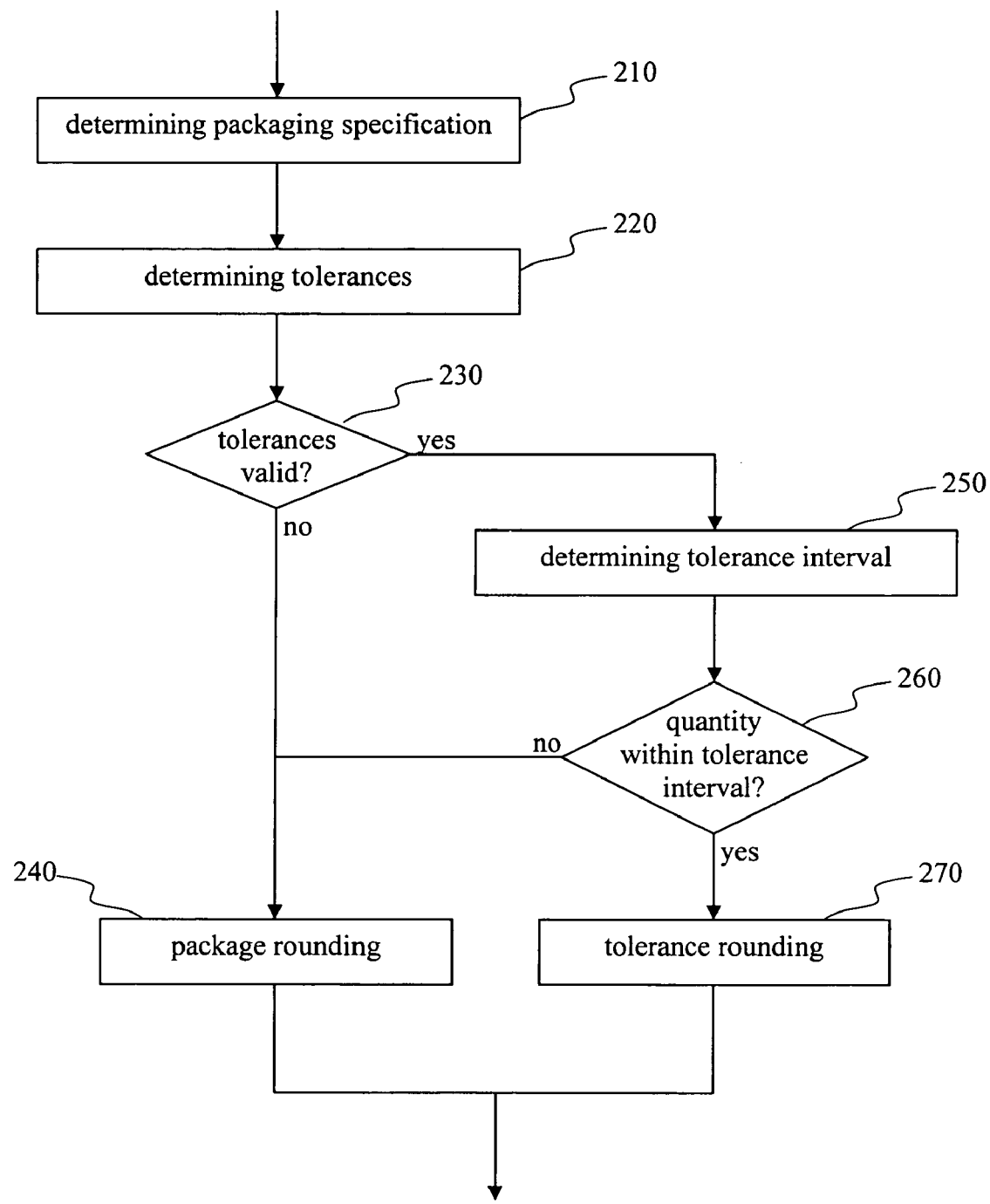
FIG. 3 illustrates a flowchart of an exemplary method for implementing rounding algorithms and tolerances, consistent with an embodiment of the present invention.

FIG. 3 illustrates an exemplary method for performing the rounding step 200 of FIG. 2. In this embodiment, a rounding to pack sizes is used for the rounding process. In other embodiments, other rounding methods, for example, rounding to complete sales units, may be used. In a first step 210, the packaging specification is determined. The packaging specification holds all data for packaging and rounding, such as package units, package size, tolerance values (up and/or down tolerances), and rounding rules (up/down/to the nearest).

As used herein, a package unit defines the unit for packages, for example, a carton or pallet. Further, the package size defines the number of pieces which are packed into a package, for instance, one carton contains ten pieces or one pallet contains hundred pieces. The tolerance values define an interval around the package size of a package unit. If the ordered quantity of products is within such an interval, the rounding process rounds the ordered quantity of products to the package size of the corresponding package unit. For example, if the package unit is one pallet containing 100 pieces and the tolerance interval for this package unit is [90 pieces; 110 pieces], then the rounding process rounds the ordered quantity of products to 100 pieces if the ordered quantity of products is within 90 pieces and 110 pieces.

A rounding rule may define how the rounding has to be performed by the rounding process. In one embodiment, three rounding rules are defined: rounding up, rounding down, and rounding to the nearest. "Rounding up" means to round up the ordered quantity of products to the next larger multiple of the smallest package size. "Rounding down" means to round down the ordered quantity of products to the next smaller multiple of the smallest package size. "Rounding to the nearest" means to round the ordered quantity of products to the nearest multiple of the smallest package size. For example, if the smallest package size is 10 pieces, then a number of 38 pieces is rounded as follows using the above described rounding rules:
rounding down→30 pieces (30 is the next smaller multiple of 10)
rounding up→40 pieces (40 is the next larger multiple of 10)
rounding to the nearest→40 pieces (40 is the nearest multiple of 10)

TABLE 1

An Exemplary Packaging Specification

| Package Unit | Package Size | Tolerance Value | Rounding Rule |
|---|---|---|---|
| 1 package | 2 pieces | | up |
| 1 carton | 5 packages = 10 pieces | ±20% (±2 pieces) | |
| 1 pallet | 10 cartons = 100 pieces | ±10% (±10 pieces) | |

As illustrated in the above exemplary table, one package contains two pieces. For the package unit, package tolerance values are not allowed. The rounding rule is defined as "rounding up" and in this packaging specification, the package unit "package" is the smallest package unit.

The next level of package unit is the carton. In this example, one carton contains five packages whereby each package contains two pieces, and thus, one carton contains 10 pieces. The tolerance values for the package unit "carton" are defined as, ±20% (i.e., ±2 pieces). The resulting tolerance interval for the package unit "one carton" is therefore [8 pieces; 12 pieces].

The next level of package unit is the pallet. In this example, one pallet contains ten cartons whereby each carton contains ten pieces, and thus, one pallet contains one hundred pieces. The tolerance values for the package unit "pallet" are defined as, ±10% (i.e., ±10 pieces). The resulting tolerance interval for the package unit "pallet" is therefore [90 pieces; 110 pieces].

For the package unit "carton" and "pallet" rounding rules are not allowed and, therefore, not defined.

The following step 220 reads the tolerance values from the packaging specification and checks their validity in step 230. In one embodiment, tolerances for the smallest packet unit are not allowed and, therefore, are not valid. If no tolerances are defined or the tolerances are not valid, the method continues with step 240 performing the package rounding method. Otherwise, the method continues with step 250. In step 250, the tolerance interval is determined. The tolerance intervals are defined as percentage values, which define upper and/or lower bound values of the interval around the packet size of the package units. In other embodiments, absolute values for the tolerance intervals may be defined.

In the instance where only the upper bound of the tolerance is defined, the lower bound is given by the package size of the respective package unit. Furthermore, where only the lower bound of the tolerance is defined, the upper bound is also given by the package size of the respective package unit.

TABLE 2

An Exemplary Packaging Specification Using Only Upper and Lower Bounds for Tolerances

| Package Unit | Package Size | Tolerance Value | Rounding Rule |
|---|---|---|---|
| 1 package | 2 pieces | | up |
| 1 carton | 5 packages = 10 pieces | +20% (+2 pieces) | |
| 1 pallet | 10 cartons = 100 pieces | −10% (−10 pieces) | |

The tolerance interval for the package unit "1 carton" is [10 pieces; 12 pieces], whereby the lower bound (10 pieces) is given by the package size of 10 pieces. The tolerance interval for the package unit "1 pallet" is [90 pieces; 100 pieces], whereby the upper bound (100 pieces) is given by the package size of 100 pieces. For the smallest package unit "package," tolerance values are not allowed therefore, no tolerance interval can be calculated.

In the next step 260, the originally required quantity is checked to determine if it is within the tolerance interval or not. If the originally required quantity is not within the tolerance interval, package rounding step 240 is performed. Otherwise tolerance rounding step 270 is performed.

The following examples demonstrate the behavior of the package rounding and the tolerance rounding.

EXAMPLE 1

Package Rounding

For the first example the packaging specification holds the following data:
package size: 6/12/18 pieces
rounding rule: up
tolerances: none

| Required Quantity | Rounded Required Quantity | Quantity on Stock | Confirmed Quantity | Rounded and Confirmed Quantity |
|---|---|---|---|---|
| 8 | 12 | 15 | 12 | 12 |

As illustrated in Example 1, the required quantity (first column) is 8 pieces. Before the availability check, the method rounds the required quantity up to 12 pieces (second column) according to the packaging specification. The availability check confirms the rounded required quantity of 12 pieces (fourth column) because the stock provides 15 pieces (third column). A second rounding step after the availability check is not necessary because the whole rounded required quantity (12 pieces) was confirmed by the availability check. The calling system holds the required quantity (8 pieces) and receives from the method the rounded confirmed quantity (12 pieces). The over confirmation of quantity may be handled by the calling system. For example, the calling system may provide a message to the customer indicating the over confirmation of quantity and the cause (e.g., package specification).

EXAMPLE 2

Package Rounding

The packaging specification for the second example holds the following data:
package size: 6/12/18 pieces
rounding rule: down
tolerances: none

| Required Quantity | Rounded Required Quantity | Quantity on Stock | Confirmed Quantity | Rounded and Confirmed Quantity | Remaining Requirement |
|---|---|---|---|---|---|
| 20 | 18 | 15 | 15 | 12 | 8 |

The meaning of the columns are as described in Example 1.

As illustrated in Example 2, the required quantity is 20 pieces. Before the availability check, the method rounds the required quantity down to 18 pieces according to the packaging specification. The availability check confirms 15 pieces. Because the confirmation of the availability check (15 pieces in fourth column) differs from the rounded required quantity (18 pieces in second column), a second rounding step after the availability check is executed. This second rounding step rounds the confirmed quantity of 15 pieces down to 12 pieces. The calling system holds the required quantity of 20 pieces. The rounded confirmed quantity of 12 pieces and the remaining requirement of 8 pieces (in sixth column) may be handled by the calling system.

EXAMPLE 3

Tolerance Rounding

For third example, the packaging specification holds the following data:

| Package size | Tolerances | rounding rule |
| --- | --- | --- |
| 10 | | Up |
| 100 | ±5% (±5 units) | |
| 1000 | ±2% (±20 units) | |

| Required Quantity | Quantity on Stock | Confirmed Quantity | Rounded Confirmed Quantity |
| --- | --- | --- | --- |
| 96 | 500 | 96 | 100 |

The rounding steps before and after the availability check may perform a tolerance rounding according to the above packaging specification. In the first step, the tolerance intervals, which are [95; 105] for package size 100 and [980; 1020] for package size 1000, are determined. For the smallest package size 10, no tolerances are defined. The required quantity of 96 pieces is within the interval [95; 105], and therefore it will be rounded to the package size 100. The process begins by checking the tolerance interval of the largest package size 1000. If the required quantity is below the tolerance interval the process continues by checking the interval of the next smaller package size 100. In this example, the process utilizes two steps for determining the correct package size and tolerance interval. If these steps are performed after the availability check, the rounding-down-rule is used.

EXAMPLE 4

Tolerance Rounding (Out of Range of Tolerances)

For the fourth example the packaging specification holds the following data:

| Package Size | Tolerances | Rounding Rule |
| --- | --- | --- |
| 10 | | Up |
| 100 | ±5% (±5 units) | |
| 1000 | ±2% (±20 units) | |

| Required Quantity | Quantity on Stock | Confirmed Quantity | Rounded Confirmed Quantity |
| --- | --- | --- | --- |
| 76 | 500 | 76 | 80 |

The rounding steps before and after the availability check may perform a tolerance rounding according to the above packaging specification. In the first step, the tolerance intervals, which are the same as in Example 3, are determined. Also as in Example 3, the process begins by checking the tolerance interval of the largest package size 1000. Because the required quantity 76 is below the tolerance interval [980; 1020], the method performs a second step by checking the required quantity 76 against the tolerance interval [95; 105] of the next smaller package size 100. The required quantity is also below the second checked tolerance intervals [95; 105] and therefore the package rounding method will be done, because for the next smaller package size no tolerances are defined and for the smallest package size tolerances are not allowed. This leads to a rounded confirmed quantity of 80 pieces. The package rounding method rounds always to a multiple of the smallest package size and 80 pieces is the next multiple of 10 pieces according to the rounding-up rule. If these steps are performed after the availability check, the rounding down rule is used.

The up/down rule refers to the smallest package size. In other embodiments, a smallest selling package size may be defined, which may be larger than the smallest non selling package size. This information may be part of the packaging specification.

In other embodiments of the invention, instead of the above-mentioned rounding algorithm, which considers one or more packaging specifications for rounding, other rounding algorithms may be used (i.e., within the rounding steps 200 and 400 in FIG. 2). For example, "rounding to complete sales units," which rounds the required quantity to one or more given sales units or a "rounding to demand quantities" may be used. Other rounding algorithms are also in the scope of the invention. It must be considered that before and after the availability check the same rounding process is to be performed.

The present techniques and above-described embodiments may be implemented in digital electronic circuitry, or in computer hardware, firmware, software, or in combinations of them. Systems consistent with the invention may be implemented in a computer program product tangibly embodied in a machine-readable storage device for execution by a programmable processor. Method steps according to the invention may be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code may be a compiled or interpreted language or code. Processors may include general and special purpose microprocessors. The processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM disks. Any of the foregoing may be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

Furthermore, to provide for interaction with a user, the invention may be implemented on a computer system having a display device such as a monitor or LCD screen for displaying information to the user and a keyboard and a pointing device, such as a mouse or a trackball by which the user can provide input to the computer system. The computer system may be programmed to provide a graphical or text user interface through which computer programs interact with users.

A computer may include a processor, memory coupled to the processor, a hard drive controller, a video controller, and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g., an RF communication link). A display is coupled to an interface, which is coupled to an I/O bus. A keyboard and pointing device are also coupled to the I/O bus. Alternatively, separate buses may be used for the keyboard, pointing device, and I/O interface.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for optimizing the result of an availability check of a required quantity of products, wherein a plurality of predetermined rounding algorithms are provided, the computer-implemented method comprising steps, prepared by a computer, of:
    determining a valid packaging specification out of a plurality of packaging specifications contained in the plurality of predetermined rounding algorithms, the packaging specifications comprising:
        at least one rounding rule; and
        a plurality of different package sizes;
    determining tolerance values from the determined packaging specification;
    evaluating as to whether the determined tolerance values are valid;
    determining tolerance intervals given by the determined tolerance values when the determined tolerance values are valid;
    checking whether the required quantity is within one of the determined tolerance intervals;
    rounding, according to at least one predetermined rounding algorithm implemented by the computer, the required quantity of products, wherein the rounding comprises at least a package-rounding-process and a tolerance-rounding-process, whereby the package-rounding-process comprises rounding the required quantity to a multiple of the smallest package size, wherein the required quantity of products is rounded up to the smallest package size when the required quantity is smaller than the smallest package size, and whereby the tolerance-rounding-process comprises rounding the required quantity to a predetermined package size;
    checking, by the computer, the availability of the rounded quantity of products;
    rounding down, according to the at least one predetermined rounding algorithm implemented by the computer, the available quantity of products when the available quantity of products is lower than the rounded required quantity of products; and
    creating a remaining requirement of products when the difference between the rounded required quantity of products and the rounded available quantity of products is larger than the smallest package size given by the packaging specification, whereby the remaining quantity is given by the difference between the required quantity of products and the rounded available quantity of products.

2. The computer-implemented method of claim 1, wherein tolerance intervals define upper and lower bounds around the package sizes for packages larger than the smallest package.

3. The computer-implemented method of claim 2, wherein the tolerance-rounding-process is performed when the packaging specification comprises valid tolerance values and the required quantity is within one of the tolerance intervals defined by the tolerance values.

4. The computer-implemented method of claim 2, wherein the package-rounding-process is performed when the predetermined packaging specification comprises invalid tolerance values.

5. The computer-implemented method of claim 2, wherein the package-rounding-process is performed when the predetermined packaging specification comprises valid tolerances and the given quantity is out of the tolerance intervals defined by the tolerance values.

6. The computer-implemented method of claim 1, wherein the at least one rounding rule comprises at least one of a rounding down rule, a rounding up rule, and a rounding to the nearest rule.

7. A computer-readable medium including program instructions for performing, when executed by a processor, a method for optimizing the result of an availability check of a required quantity of products, wherein a plurality of predetermined rounding algorithms are provided, the method comprising:
    determining a valid packaging specification out of a plurality of packaging specifications contained in the plurality of predetermined rounding algorithms, the packaging specifications comprising:
        at least one rounding rule; and
        a plurality of different package sizes;
    determining tolerance values from the determined packaging specification;
    evaluating as to whether the determined tolerance values are valid;
    determining tolerance intervals given by the determined tolerance values when the determined tolerance values are valid;

checking whether the required quantity is within one of the determined tolerance intervals;

rounding, according to at least one predetermined rounding algorithm implemented by the computer, the required quantity of products, wherein the rounding comprises at least a package-rounding-process and a tolerance-rounding-process, whereby the package-rounding-process comprises rounding the required quantity to a multiple of the smallest package size, wherein the required quantity of products is rounded up to the smallest package size when the required quantity is smaller than the smallest package size, and whereby the tolerance-rounding-process comprises rounding the required quantity to a predetermined package size;

checking, by the computer, the availability of the rounded quantity of products;

rounding down, according to the at least one predetermined rounding algorithm implemented by the computer, the available quantity of products when the available quantity of products is lower than the rounded required quantity of products; and creating a remaining requirement of products when the difference between the rounded required quantity of products and the rounded available quantity of products is larger than the smallest package size given by the packaging specification, whereby the remaining quantity is given by the difference between the required quantity of products and the rounded available quantity of products.

8. The method of claim 7, wherein tolerance intervals define upper and lower bounds around the package sizes for packages larger than the smallest package.

* * * * *